United States Patent
Motowaki

(10) Patent No.: US 10,703,581 B2
(45) Date of Patent: Jul. 7, 2020

(54) WORKPIECE FIXING TOOL, WORKPIECE TRANSPORT DEVICE, AND ROBOT SYSTEM

(71) Applicant: FANUC CORPORATION, Yamanashi (JP)

(72) Inventor: Yoshio Motowaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/181,609

(22) Filed: Nov. 6, 2018

(65) Prior Publication Data
US 2019/0193950 A1    Jun. 27, 2019

(30) Foreign Application Priority Data
Dec. 22, 2017   (JP) .................. 2017-246479

(51) Int. Cl.
*B65G 47/90* (2006.01)
*B25J 15/02* (2006.01)
*B25J 15/00* (2006.01)
*B25J 15/08* (2006.01)

(52) U.S. Cl.
CPC .......... *B65G 47/90* (2013.01); *B25J 15/0095* (2013.01); *B25J 15/0253* (2013.01); *B25J 15/08* (2013.01)

(58) Field of Classification Search
CPC ... B25B 1/08; B25B 5/08; B25B 5/085; B25J 15/0095; B25J 15/0253; B25J 15/08; B65G 47/90
USPC ........................................................ 414/735
See application file for complete search history.

(56) References Cited

U.S. PATENT DOCUMENTS 4,928,385 A    5/1990  Noguchi et al.

FOREIGN PATENT DOCUMENTS

| JP | H08-197474 A | 8/1996 |
|----|---|---|
| JP | H10-157825 A | 6/1998 |
| JP | 2009-018379 A | 1/2009 |
| JP | 2009018379 A * | 1/2009 |
| JP | 2012-071359 A | 4/2012 |
| JP | 2012071359 A * | 4/2012 |
| JP | 2016-196071 A | 11/2016 |

OTHER PUBLICATIONS

Japanese Office Action dated Nov. 5, 2019, in connection with corresponding JP Application No. 2017-246479 (7 pgs., including machine-generated English translation).

* cited by examiner

*Primary Examiner* — Saul Rodriguez
*Assistant Examiner* — Brendan P Tighe
(74) *Attorney, Agent, or Firm* — Maier & Maier, PLLC

(57) ABSTRACT

A workpiece is quickly fixed and released without using a driving device. A workpiece fixing tool includes: a pair of grip members that are disposed so as to face each other in a substantially horizontal direction and that can open and close in an opposite direction in which the grip members face each other, the grip members gripping a workpiece therebetween in a closed state; and urging members that urge the pair of grip members in closing directions. The pair of grip members have inclined faces facing each other, the inclined faces forming an angle with respect to each other such that a distance therebetween in the opposite direction in which the inclined faces face each other gradually decreases from upper side to lower side.

2 Claims, 2 Drawing Sheets

WORKPIECE FIXING TOOL, WORKPIECE TRANSPORT DEVICE, AND ROBOT SYSTEM

CROSS-REFERENCE TO RELATED APPLICATIONS

This application is based on Japanese Patent Application No. 2017-246479, the contents of which are incorporated herein by reference.

FIELD

The present invention relates to a workpiece fixing tool, a workpiece transport device, and a robot system.

BACKGROUND

In a known robot system in the related art, a transport device transports a workpiece from one place to another, and robots perform operations on the workpiece at their positions. The workpiece needs to be fixed so as not to move during transportation by the transport device or during the operations performed by the robots. Typically, a chuck-type tool, which can open and close, and an electric cylinder or an air cylinder, which drives the tool open and closed, are used to fix the workpiece.

Meanwhile, a chuck-type robot hand that grips and releases a workpiece not by using a driving device such as a cylinder but by using urging forces of springs is known (for example, see Japanese Unexamined Patent Application Publication No. 2016-196071, and Japanese Unexamined Patent Application Publication No. Hei 08-197474).

SUMMARY

An aspect of the present invention is a workpiece fixing tool for fixing a workpiece that is transported in a substantially horizontal linear direction. The workpiece fixing tool includes: a pair of grip members that are disposed so as to face each other in the substantially horizontal direction and that can open and close in a opposite direction in which the grip members face each other, the pair of grip members gripping the workpiece therebetween in a closed state; and urging members that urge the pair of grip members in closing directions. The pair of grip members have inclined faces facing each other, the inclined faces forming an angle with respect to each other such that a distance therebetween in the opposite direction in which the inclined faces face each other gradually decreases from upper side to lower side.

In the above aspect, the pair of grip members may be disposed so as to face each other in the linear direction.

Another aspect of the present invention is a workpiece transport device including: a linear rail disposed substantially horizontally; a slider that moves along the rail; and the workpiece fixing tool according to the above aspect, provided on the slider.

Another aspect of the present invention is a robot system including: the workpiece transport device according to the above aspect; and a robot disposed near the rail of the workpiece transport device, and has a robot hand for gripping the workpiece. The robot lowers the robot hand between the pair of grip members, along the inclined faces to open the pair of grip members. The robot raises the robot hand between the pair of grip members to close the pair of grip members by urging forces exerted by the urging members.

DETAILED DESCRIPTION

A workpiece fixing tool 1, a workpiece transport device 2, and a robot system 100 according to an embodiment of the present invention will be described below with reference to the drawings.

Figure 1:
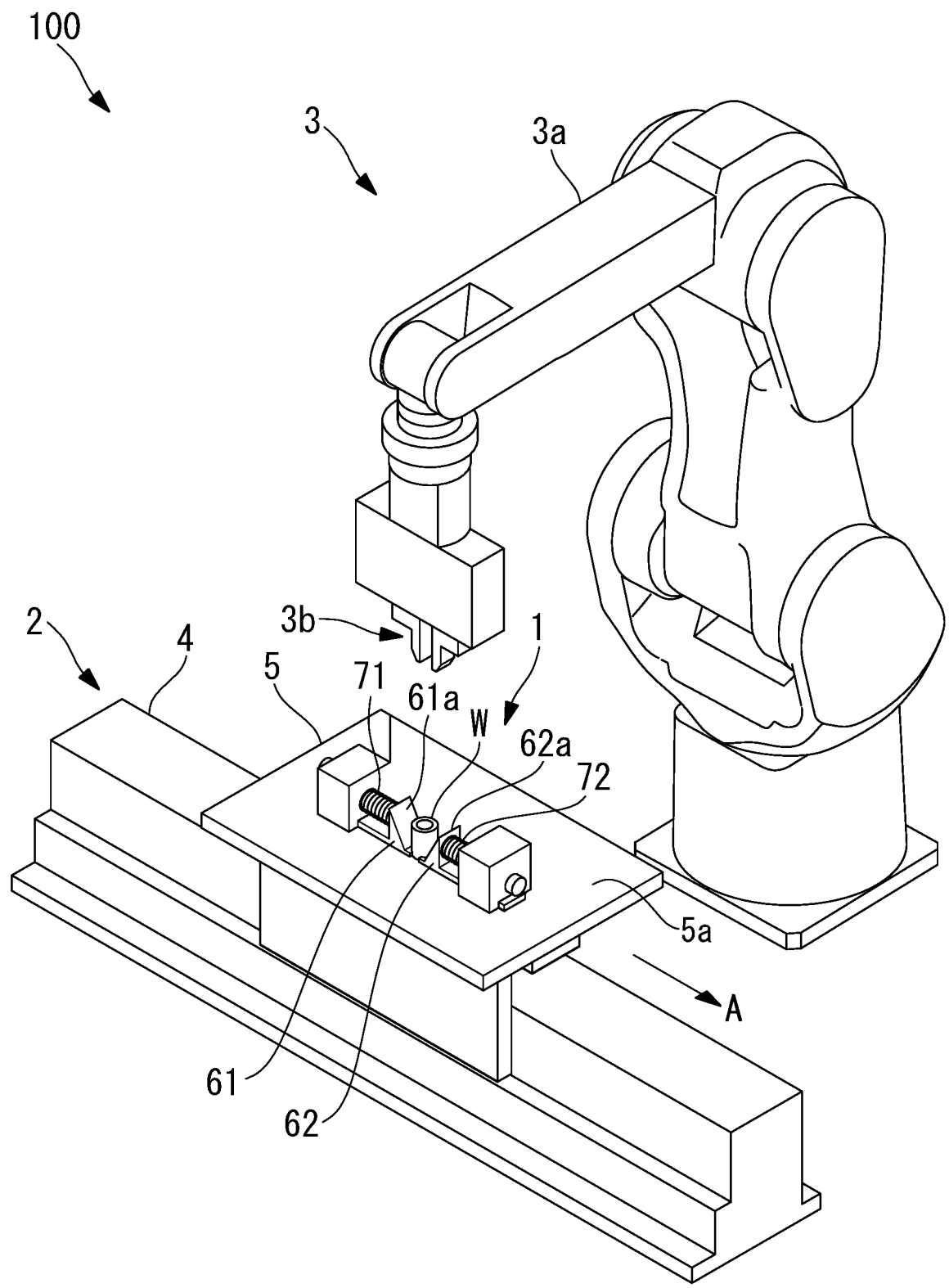
FIG. 1 shows the configuration of a robot system according to an embodiment of the present invention.

As shown in FIG. 1, the robot system 100 according to this embodiment includes the workpiece transport device 2, which transports a workpiece W held by the workpiece fixing tool 1 in a substantially horizontal linear direction A, and a plurality of robots 3 disposed near a rail 4 of the workpiece transport device 2. The plurality of robots 3 are disposed at a plurality of positions so as to be spaced apart from one another in the linear direction A. FIG. 1 shows only one of the plurality of robots 3.

Although FIG. 1 shows a cylindrical workpiece W as an example, the shape of the workpiece W is not limited thereto.

The robot system 100 includes a control unit (not shown) that controls the overall operation of the system 100. The workpiece transport device 2 is controlled by the control unit so as to transport the workpiece W from the upstream side to the downstream side while temporarily stopping the workpiece W at the positions of the robots 3 as necessary. The plurality of robots 3 are controlled by the control unit so as to perform predetermined operations on the workpiece W that is being transported by the workpiece transport device 2.

The workpiece transport device 2 includes the linear rail 4, which is disposed substantially horizontally, a slider 5 that moves along the rail 4, and the workpiece fixing tool 1 provided on the slider 5. The slider 5 includes a substantially horizontal upper surface 5a, on which the workpiece fixing tool 1 is provided. The workpiece transport device 2 transports the workpiece W on the slider 5 in the linear direction A by moving the slider 5 in the linear direction A, which is the longitudinal direction of the rail 4.

The workpiece fixing tool 1 includes a pair of grip members 61 and 62, which are disposed on the upper surface 5a of the slider 5 so as to face each other in the linear direction A and can open and close in the linear direction A, and a pair of urging members 71 and 72, which are disposed on both sides of the pair of grip members 61 and 62 in the linear direction A and urge the pair of grip members 61 and 62 in closing directions.

The grip members 61 and 62 are supported on the upper surface 5a so as to be movable in the linear direction A. The pair of grip members 61 and 62 open as they move in the directions away from each other and close as they move in the directions toward each other.

Figure 2:
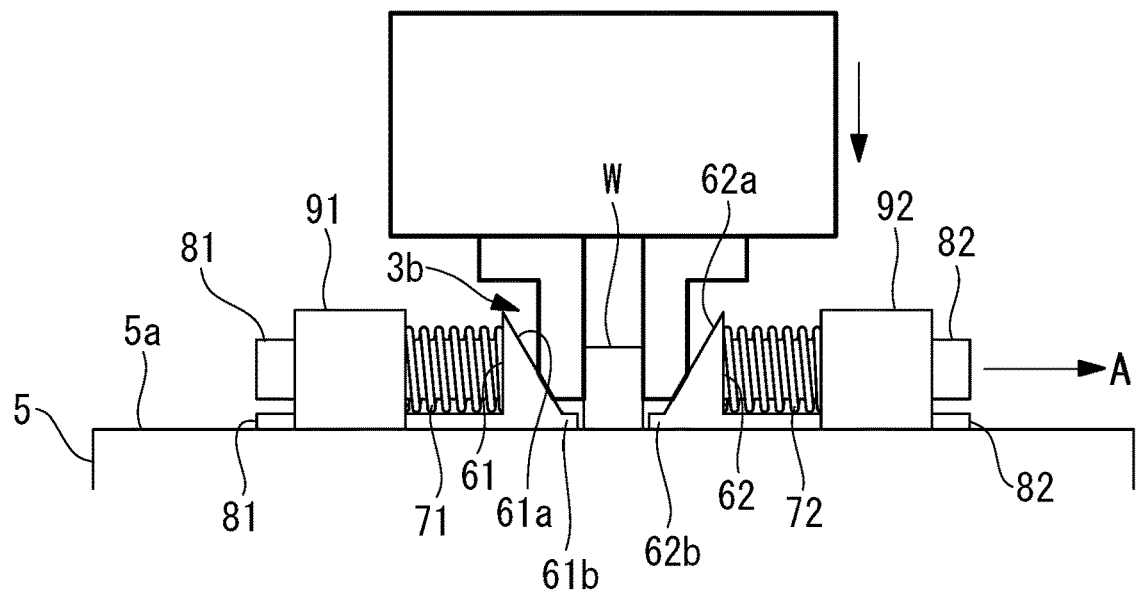
FIG. 2 is a side view of a workpiece fixing tool in the robot system in FIG. 1, showing an operation in which a robot supplies a workpiece to the workpiece fixing tool of a workpiece transport device.
Figure 3:
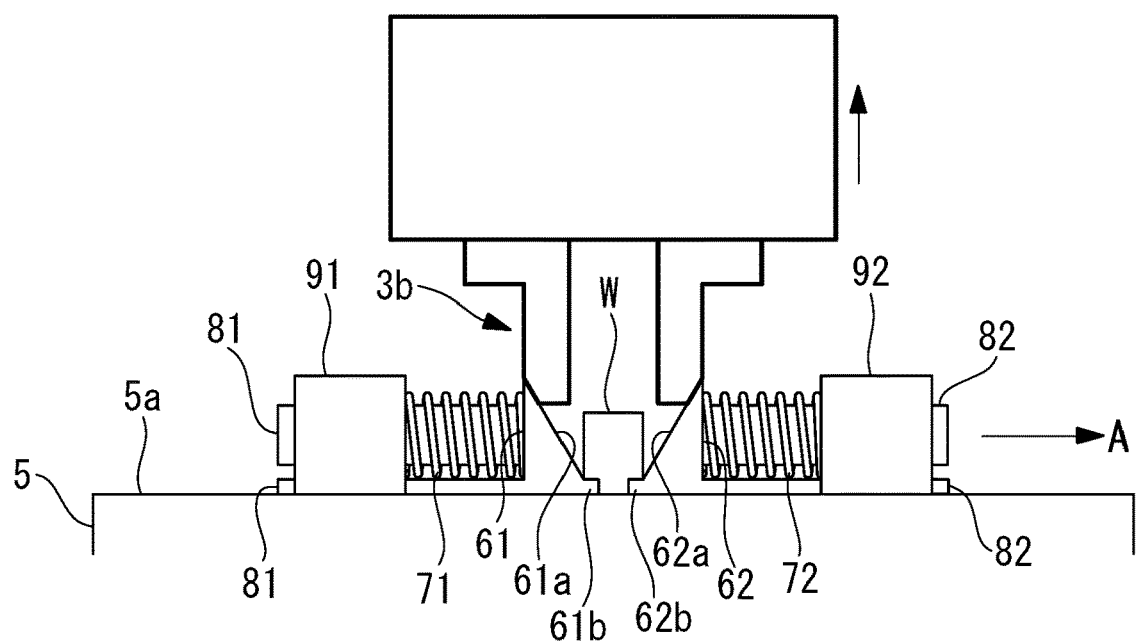
FIG. 3 is a side view of the workpiece fixing tool of the robot system in FIG. 1, showing an operation in which the robot supplies a workpiece to the workpiece fixing tool of the workpiece transport device.

More specifically, as shown in FIGS. 2 and 3, the first grip member 61 has two shafts 81, which are parallel to each other and extend away from the second grip member 62 in the linear direction A. The two shafts 81 are supported so as to be movable in the linear direction A by a fixing part 91 fixed on the upper surface 5a. Similarly, the second grip member 62 has two shafts 82, which are parallel to each other and extend away from the first grip member 61 in the linear direction A. The two shafts 82 are supported so as to be movable in the linear direction A by a fixing part 92 fixed to the upper surface 5a.

The grip members 61 and 62 may be supported so as to be movable in the linear direction A in another way.

The urging members 71 and 72 are, for example, coil springs disposed in the linear direction A. The first urging member 71 is disposed between the first grip member 61 and the fixing part 91 and urges the first grip member 61 toward the second grip member 62. The second urging member 72 is disposed between the second grip member 62 and the fixing part 92 and urges the second grip member 62 toward the first grip member 61. The pair of grip members 61 and 62 grip the workpiece W disposed therebetween with the urging forces exerted by the urging members 71 and 72 to fix the workpiece W to the slider 5.

Opposing surfaces 61a and 62a of the pair of grip members 61 and 62 are inclined faces having an angle with respect to each other. The distance between the inclined faces 61a and 62a in the linear direction A gradually decreases from upper side to lower side. The inclined faces 61a and 62a are flat surfaces or curved surfaces that are smoothly continuous from the upper ends to the lower ends. Although the inclined faces 61a and 62a are illustrated as flat surfaces in the drawings, the inclined faces 61a and 62a may be curved surfaces. Although both inclined faces 61a and 62a are inclined in opposite directions at the same angle with respect to the vertical direction in the drawings, the inclined faces 61a and 62a may be inclined at different angles. Alternatively, of the pair of inclined faces 61a and 62a, one may extend in the vertical direction and the other may be inclined with respect to the vertical direction.

Reference signs 61b and 62b denote support parts that support the outer surfaces of the workpiece W. The support parts 61b and 62b are provided below the inclined faces 61a and 62a. The support parts 61b and 62b have recesses into which the workpiece W fits in the linear direction A, so as to support the workpiece W on both sides in the linear direction A and on both sides in the direction perpendicular to the linear direction A.

The robots 3 each have an arm 3a and a robot hand 3b, which is attached at an end of the arm 3a and can open and close in the linear direction A. Although the robot 3 illustrated in FIG. 1 is a six-axis articulated robot, the robot 3 may be of another type.

The arm 3a can raise and lower the robot hand 3b in the substantially vertical direction.

The robot hand 3b includes a pair of grip claws that face each other in the linear direction A and that grip a workpiece W therebetween. When the pair of grip claws move in the directions away from each other, the robot hand 3b opens, and when the pair of grip claws move in the directions toward each other, the robot hand 3b closes.

The distance, in the linear direction A, between the upper ends of the inclined faces 61a and 62a of the pair of grip members 61 and 62 in a closed state is larger than the dimension, in the linear direction A, of the robot hand 3b in an open state, so that the robot hand 3b in an open state can be inserted between the pair of grip members 61 and 62 in a closed state from above.

Next, the operation of the thus-configured robot system 100 will be described.

First, a robot 3 on the upstream side supplies a workpiece W to the workpiece fixing tool 1 of the workpiece transport device 2. As shown in FIG. 2, in the operation of supplying the workpiece W, the robot 3 grips the workpiece W with the robot hand 3b and lowers the robot hand 3b from above the pair of grip members 61 and 62 to insert the robot hand 3b between the pair of grip members 61 and 62.

Because the distance between inclined faces 61a and 62a of the pair of grip members 61 and 62 gradually decreases from upper side to lower side, the robot hand 3b comes into contact with the pair of inclined faces 61a and 62a as it lowers and pushes the pair of grip members 61 and 62 in opening directions. The force with which the robot 3 lowers the robot hand 3b is sufficiently larger than the urging forces exerted by the urging members 71 and 72. Hence, the robot hand 3b, while pushing the pair of grip members 61 and 62 open against the urging forces exerted by the urging members 71 and 72, lowers along the inclined faces 61a and 62a to a position where the workpiece W touches or approaches the upper surface 5a.

Next, while further pushing the pair of grip members 61 and 62 open, the robot 3 opens the robot hand 3b to release the workpiece W and positions the workpiece W between the pair of grip members 61 and 62. Then, the robot 3 raises the robot hand 3b in an open state to a position above the pair of grip members 61 and 62. While the robot hand 3b is raising between the pair of grip members 61 and 62, the pair of grip members 61 and 62 are gradually closed by the urging forces exerted by the urging members 71 and 72. When the robot hand 3b leaves the inclined faces 61a and 62a, the workpiece W is gripped by the pair of grip members 61 and 62 and is fixed to the slider 5.

After the workpiece W is fixed to the slider 5 by the workpiece fixing tool 1, the workpiece W is transported by the workpiece transport device 2 and is subjected to an operation, such as machining, by another robot 3. Then, a robot 3 on the downstream side discharges the workpiece W from the workpiece fixing tool 1 of the workpiece transport device 2.

When discharging the workpiece W, the robot 3 lowers the robot hand 3b in an open state from above the pair of grip members 61 and 62 and insert the robot hand 3b between the pair of grip members 61 and 62. The robot hand 3b comes into contact with the pair of inclined faces 61a and 62a as it lowers and, while pushing the pair of grip members 61 and 62 open against the urging forces exerted by the urging members 71 and 72, lowers to a position where the robot hand 3b can grip the workpiece W. At this time, as a result of the pair of grip members 61 and 62 opening, the workpiece W fixed by the pair of grip members 61 and 62 is released.

Thereafter, the robot 3 closes the robot hand 3b to grip the workpiece W and raises the closed robot hand 3b to a position above the pair of grip members 61 and 62. While the robot hand 3b raises between the pair of grip members 61 and 62, the pair of grip members 61 and 62 are closed by the urging forces exerted by the urging members 71 and 72.

The robot 3 may insert the closed robot hand 3b between the pair of grip members 61 and 62 and open the robot hand 3b between the pair of grip members 61 and 62.

As has been described above, in this embodiment, because of the inclined faces 61a and 62a provided on the pair of grip members 61 and 62 and the urging members 71 and 72 for urging the pair of grip members 61 and 62 in the closing directions, the pair of grip members 61 and 62 open as the robot hand 3b lowers and close as the robot hand 3b raises. This leads to an advantage in that it is possible to fix and release the workpiece W with a simple and compact mechanism, compared with a case where a driving device such as a cylinder is used. This leads to an advantage in that it is possible to reduce the weight and cost of the workpiece fixing tool 1. Because the pair of grip members 61 and 62 simultaneously open and close as the robot hand 3b lowers and raises, there is an advantage in that it is possible to reduce the tact time needed to supply and discharge the workpiece W, compared with a case where the pair of grip members 61 and 62 are driven by the driving device so as to open and close.

When the workpiece W is transported at a high speed by the workpiece transport device 2, it is important to fix the workpiece W so as to prevent movement and tilting of the workpiece W due to the inertial force in the linear direction A. Specifically, when the movement starts, a large inertial force directed toward the downstream side in the linear direction A acts on the workpiece W due to sudden acceleration, and when the movement stops, a large inertial force directed toward the upstream side in the linear direction A acts on the workpiece W due to sudden deceleration. Meanwhile, an inertial force in the direction perpendicular to the linear direction A hardly acts on the workpiece W.

In this embodiment, because the pair of grip members 61 and 62 disposed on both sides of the workpiece W in the linear direction A grip the workpiece W in the linear direction A, the workpiece W is stably fixed in the linear direction A. This leads to an advantage in that it is possible to effectively prevent movement and tilting of the workpiece W due to sudden acceleration or deceleration.

In FIGS. 2 and 3, the outer surfaces of the robot hand 3b and the inclined faces 61a and 62a are in surface contact with each other. However, the shapes of the outer surfaces of the robot hand 3b and the inclined faces 61a and 62a may be designed such that the outer surfaces of the robot hand 3b and the inclined faces 61a and 62a make line or point contact with each other.

It is also possible to configure the arrangement such that rollers that are rotatable about rotation axes perpendicular to the linear direction A are provided on the outer surfaces of the robot hand 3b, and the rollers and the inclined faces 61a and 62a contact each other. By providing the rollers, a frictional force caused during lowering of the robot hand 3b can be reduced.

In this embodiment, although both of the pair of grip members 61 and 62 are movable in the linear direction A and are moved in the closing directions by the urging members 71 and 72, instead only one of the pair of grip members 61 and 62 may be movable in the linear direction A and may be urged in the closing direction by the urging member 71 or 72.

In this embodiment, although the pair of grip members 61 and 62 are disposed so as to face each other in the linear direction A, when the workpiece W is transported at low speed by the workpiece transport device 2, when the acceleration or deceleration at the start or stop of the movement is moderate, or in other cases, the pair of grip members 61 and 62 may be disposed so as to face each other in a direction intersecting the linear direction A.

As a result, the following aspect is read from the above described embodiment of the present invention.

An aspect of the present invention is a workpiece fixing tool for fixing a workpiece that is transported in a substantially horizontal linear direction. The workpiece fixing tool includes: a pair of grip members that are disposed so as to face each other in the substantially horizontal direction and that can open and close in a opposite direction in which the grip members face each other, the pair of grip members gripping the workpiece therebetween in a closed state; and urging members that urge the pair of grip members in closing directions. The pair of grip members have inclined faces facing each other, the inclined faces forming an angle with respect to each other such that a distance therebetween in the opposite direction in which the inclined faces face each other gradually decreases from upper side to lower side.

The workpiece fixing tool according to this aspect is used in combination with a robot having a robot hand. When the robot hand gripping a workpiece lowers and raises between the pair of grip members, the workpiece is supplied to and is discharged from the pair of grip members. At this time, as the robot hand lowers, the pair of grip members open against the urging forces exerted by the urging members, and, as the robot hand raises, the pair of grip members close by yielding to the urging forces exerted by the urging members.

More specifically, the robot hand comes into contact with the inclined faces of the pair of grip members while lowering between the pair of grip members and then, the robot hand lowers along the inclined faces. Because the distance between the inclined faces gradually decreases from upper side to lower side, the robot hand lowers while pushing the pair of grip members open. Thereafter, when the robot hand raises along the inclined faces, the pair of grip members are closed by the urging forces exerted by the urging members.

As described above, because the pair of grip members are driven so as to open and close by the lowering and raising of the robot hand and the urging forces exerted by the urging members, a driving device such as a cylinder is unnecessary. Because the pair of grip members are simultaneously opened as the robot hand is lowered and are simultaneously closed as the robot hand is raised, the workpiece can be quickly fixed and released.

In the above aspect, the pair of grip members may be disposed so as to face each other in the linear direction.

When the workpiece is transported at high speed in the linear direction, a large inertial force in the linear direction acts on the workpiece due to sudden acceleration and deceleration at the start and stop of the movement. By gripping the workpiece with the pair of grip members disposed on both sides of the workpiece in the linear direction, it is possible to effectively prevent movement and tilting of the workpiece due to the inertial force.

Another aspect of the present invention is a workpiece transport device including: a linear rail disposed substantially horizontally; a slider that moves along the rail; and the workpiece fixing tool according to the above aspect, provided on the slider.

Another aspect of the present invention is a robot system including: the workpiece transport device according to the above aspect; and a robot disposed near the rail of the workpiece transport device, and has a robot hand for gripping the workpiece. The robot lowers the robot hand between the pair of grip members, along the inclined faces to open the pair of grip members. The robot raises the robot hand between the pair of grip members to close the pair of grip members by urging forces exerted by the urging members.

REFERENCE SIGNS LIST 1 workpiece fixing tool
2 workpiece transport device
3 robot
3a arm
3b robot hand
4 rail
5 slider
61, 62 grip member
61a, 62a inclined face
71, 72 urging member
100 robot system
A linear direction
W workpiece

The invention claimed is:

1. A robot system comprising:
a workpiece transport device and a robot,
wherein the workpiece transport device comprises:
    a linear rail disposed substantially horizontally;
    a slider that moves along the rail; and
    a workpiece fixing tool provided on the slider,
wherein the workpiece fixing tool comprises:
    a pair of grip members that are disposed so as to face each other in a substantially horizontal direction and which can open and close in an opposite direction in which the pair of grip members face each other, the pair of grip members gripping the workpiece therebetween in a closed state; and
    urging members that urge the pair of grip members in a closing direction, wherein the pair of grip members have inclined faces facing each other, the inclined faces forming an angle with respect to each other such that a distance therebetween in the opposite direction in which the inclined faces face each other gradually decreases from an upper side to a lower side,
wherein the robot is disposed near the rail of the workpiece transport device and has a robot hand that grips the workpiece,
wherein the robot lowers the robot hand between the pair of grip members and along the inclined faces to open the pair of grip members, and
wherein the robot raises the robot hand between the pair of grip members to close the pair of grip members via urging forces exerted by the urging members.

2. The robot system according to claim 1, wherein the pair of grip members are disposed so as to face each other in the substantially horizontal linear direction.

\* \* \* \* \*